F. G. GREEN.
PLANTER.
APPLICATION FILED JUNE 6, 1916.
1,208,309.
Patented Dec. 12, 1916.
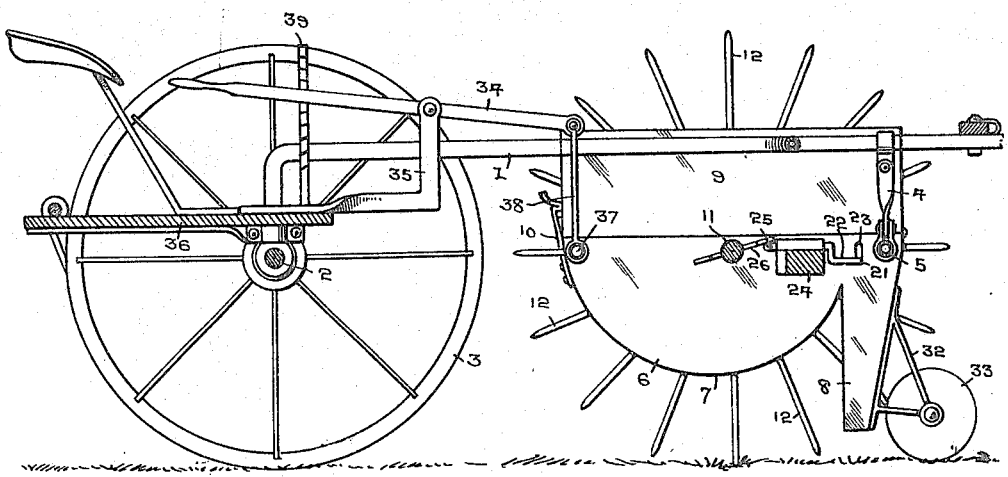
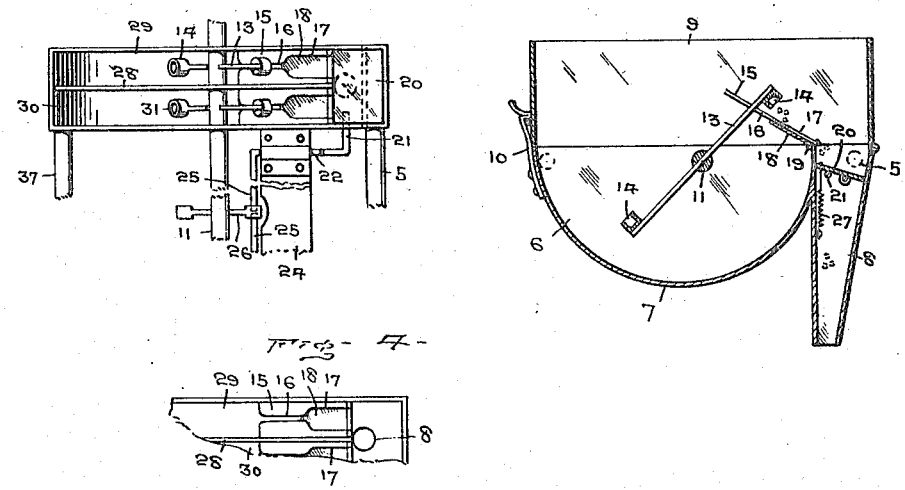
Inventor
Felix G. Green
By W. J. Fitzgerald
Attorney

UNITED STATES PATENT OFFICE.

FELIX G. GREEN, OF SEDALIA, MISSOURI.

PLANTER.

1,208,309.

Specification of Letters Patent.

Patented Dec. 12, 1916.

Application filed June 6, 1916. Serial No. 102,084.

*To all whom it may concern:*

Be it known that I, FELIX G. GREEN, a citizen of the United States, residing at Sedalia, in the county of Pettis and State of Missouri, have invented certain new and useful Improvements in Planters; and I do hereby declare the following to be a full, clear, and exact description of the invention, such as will enable others skilled in the art to which it appertains to make and use the same.

My invention relates to new and useful improvements in planters and more particularly to that class adapted to be used for planting corn or like grain, and my object is to provide means for depositing the grain from a hopper into a tube.

A further object is to provide means for intermittently releasing the grain so that it will descend into the tube.

A further object is to provide means for rotating the seed carrying devices.

A further object is to provide means for raising and lowering the seed carrying and planting device. And a further object is to provide means for carrying fertilizer and depositing the same into the tube whereby it will descend through the tube with the grain.

Other objects and advantages will be hereinafter set forth and more particularly pointed out in the accompanying specification.

In the accompanying drawings which are made a part of this application, Figure 1 is a vertical longitudinal sectional view through the planter. Fig. 2 is a detail sectional view through one of the grain boxes and tube coöperating therewith. Fig. 3 is a detail top plan view of one of the grain boxes and the mechanism for releasing the grain after being deposited in the tube, and Fig. 4 is a fragmentary top plan view of the grain hopper with the means for carrying the seed and fertilizer to the tube omitted.

Referring to the drawings in which similar reference numerals designate corresponding parts throughout the several views, 1 indicates a frame which is preferably constructed of tubing of any preferred shape, one end thereof being supported by an axle 2, which axle is in turn supported by wheels 3, said wheels being of the usual or any preferred type for covering the grain after it has been deposited upon the ground.

Depending from the frame 1 are hangers 4, the lower ends of which are secured to a cross bar 5, the ends of the cross bar being attached to the forward ends of the grain carrying boxes 6, the hangers 4 being preferably formed in sections and pivoted together so that the grain boxes may have a limited swinging movement.

The bottom wall 7 of the boxes 6 is disposed in the arc of a circle so that any grain placed therein will gradually move to the center or lowermost portion of the bottom of the box, the upper portion of the box being made separable from the portion thereof having the curved bottom wall, and attached to the curved wall 7 at the forward end of the box is a tube 8 through which the grain is carried from the box to the ground, said tube being preferably formed integral with the box, although the same may be attached thereto in any suitable manner. The forward edge of the upper portion 9 of the box is hingedly secured to the upper end of the tube 8, while the opposite end thereof is held in position over the lower portion of the box by means of a latch 10.

Extending transversely of the planter and through the grain boxes 6 is a shaft 11, the outer ends of the shaft having a plurality of spokes 12 attached thereto, the ends of the spokes being adapted to engage the soil when the planter is in operation to rotate the shaft, and removably attached to the shaft are arms 13 having at their free ends cups 14 which are designed to carry the grain from the boxes 6 to the tubes 8 as the shaft 11 is rotated.

As the cups 14 do not come into registration with the open end of the tube 8, a guard 15 is extended inwardly and upwardly from the inner edge of the tube 8, said guard having a slot 16 extending longitudinally thereof which terminates at its inner end into an enlarged opening 17, said opening being of sufficient dimension to permit the cups to pass therethrough. The grain, etc., discharged from the cups falls upon the guard 15, and in view of the inclination of the guard, descends into the upper end of the tube 8, and in order to prevent the grain from descending through the opening 17, a plate 18 is positioned below the opening 17, the lower end of the plate being secured to the box 6 by any suitable form of spring actuated hinge 19 so that when the cup engages the plate it will descend and permit the cup to pass through the opening 17, and will immediately move to closed position. In order to control the descent of the grain through the tube 8, a trap 20 is positioned within the tube, adjacent the upper end thereof, said trap being preferably hinged or pivotally mounted within the tube and at a point between its ends, and in order to cause the grain to pass to one end of the trap it is preferably disposed at a slight angle.

At certain intervals, or at a predetermined time after the cup has deposited its contents on the guard and it has descended on the trap 20, said trap is tilted to permit the grain to descend through the tube, this being accomplished by extending one end 21 of a trip lever 22 through a slot 23 in the wall of the tube and below the trap, at one side of its pivot point, said trip being pivotally mounted to a frame member 24 extending from one grain box to the other, said frame member being positioned at a suitable point between the tube and the shaft 11. The opposite end 25 of the lever 22 is extended parallel with the frame member 24 to a point substantially at the longitudinal center of the frame member, said end 25 being engaged at its terminus by trip arms 26 attached to the shaft 11, and as there is a trip lever for each box, the one trip arm will operate both levers simultaneously.

As soon as the trip arm 26 is released from the ends 25 of the trip lever 22, the trap 20 will be instantly brought to its lowered position by means of a spring 27, this action also returning the ends 25 of the levers 22 to proper position to be engaged by the next succeeding trip arm as it is rotated into engagement with said ends. In addition to providing a grain box, a partition 28 may be extended centrally through the grain box, transversely of the shaft 11 thereby dividing the grain box into compartments 29 and 30, one compartment containing grain, while the other compartment receives fertilizer, and in order to distribute the fertilizer upon the ground and preferably coincident to the discharge of the grain from the tube, cups 31 are provided which are the same as the cups 14 and operate in the same manner, and as the cups 31 are arranged in alinement with the cups 14, the fertilizer will be discharged on to the trap 20 simultaneously with the depositing of the grain thereon so that when the trap is tilted the fertilizer will descend with the grain.

Positioned forwardly of the tube 8 and attached thereto by means of a bracket 32 is a disk 33 which is adapted to sever weeds, etc., in the path of the lower end of the tube. The grain carrying boxes and the spokes may be raised upwardly until the spokes are out of engagement with the earth surface, thereby stopping the rotation of the shaft 11, through the medium of a lever 34, which is pivotally secured to a bracket 35, which bracket is in turn carried by a platform 36 mounted upon the frame 1, the forward end of the lever 34 being attached to a cross bar 37 connecting the grain boxes 6 at their inner ends by means of a link 38, said lever coöperating with a rack 39 which holds the lever in its adjusted position.

In operation, a prescribed quantity of grain is placed in the grain boxes 6, and if fertilizer is to be used a predescribed quantity of fertilizer is also placed in the compartments 30, after which the lever 34 is released from the rack 39 and the grain boxes and parts attached thereto lowered until the ends of the spokes are properly engaged with the earth surface. As the planter is moved forwardly the spokes will cause the shaft 11 to rotate, thereby depositing the grain and also the fertilizer, if such is used, on to the trap 20, and the trip arms 26 will be likewise moved into engagement with the ends of the trip lever 22 and thus operate the trap to release the grain and the fertilizer deposited thereon.

As shown in the drawings, the cups are arranged for checking the corn, but by adding other cups to the shaft, the corn may be drilled or planted more thickly, in which instance, the number of trip arms are correspondingly increased or when the grain is being drilled, the trap 20 may be removed from the tube 8, if desired. It will likewise be seen that by regulating the size of the cups, a greater or less number of grains may be deposited upon the trap with each revolution of the cup, and this is also true of the fertilizer carrying cups.

I claim:—

1. In a planter, the combination with a frame supporting wheels therefor, of grain carrying boxes on said frame, of a shaft extending transversely through said boxes, cups attached to said shaft adapted to be rotated through the boxes, a tube at one end of each box, inclined guards to cause the contents of the cups to descend into said tube, said guards having openings for the passage of said cups, spring pressed hingedly mounted plates below said openings to prevent the passage of the contents of the cups through said openings, a trap in each tube to stop the descent of the contents of the cup at a point within the tube, trip arms carried by said shaft, and a trip lever connected to said trap and operated by said arms to release the contents of the cup and permit the same to descend through said tube.

2. In a planter, the combination with a frame, of a pair of grain carrying boxes on said frame, slotted inclined guards in said boxes, a shaft extending transversely of the frame and through said boxes, each end of said shaft having a plurality of spokes attached thereto, said spokes being adapted to rotate said shaft, cups removably secured to the shaft and adapted to rotate through said boxes and through the slots in said guards, a tube at the forward end of each box, hingedly mounted below said slots, springs to normally hold said plates adjacent the guards to convey the contents of the cups into said tube, a trap pivoted in each tube, and means to intermittently operate the trap to permit the contents of the cup to descend through the tube.

3. In a planter, a pair of boxes, a shaft extending through said boxes, means to cause said shaft to rotate, a tube at one end of each box, cups attached to said shaft and adapted to rotate therewith to carry the contents of the box to a position to be deposited in the tube, a tilting trap to stop the descent of the contents of the cup at a point adjacent the upper end of the tube, a plurality of trip arms carried by said shaft and a trip lever attached to said trap and operated by said trip arms to intermittently tilt the trap to permit the contents of the cup to descend through the tube.

4. In a planter, the combination with a pair of boxes having a partition disposed in each box and dividing each box into two compartments, a common discharge tube for both of said compartments, a trap arranged in each discharge tube, a shaft extending through said boxes, radial arms projecting from said shaft in each of said compartments, and a grain cup carried by each arm, of a guard attached at one end to one end wall of each compartment, said guards extending upwardly and inwardly at an angle in each compartment and in the path of said arms and cups, each guard having a slot for the passage of said arms and an opening for the passage of said cups, and a plate hingedly mounted below each of said guards adapted to normally cover the opening in the guard, each pair of guards adapted to discharge the contents of said cups on to the trap in the adjacent tube for simultaneous delivery.

In testimony whereof I have signed my name to this specification in the presence of two subscribing witnesses.

FELIX G. GREEN.

Witnesses:
ARTHUR L. CRANDALL,
HENRY K. BEUTE.

Copies of this patent may be obtained for five cents each, by addressing the "Commissioner of Patents, Washington, D. C."